US011952034B2

(12) United States Patent
Jones et al.

(10) Patent No.: US 11,952,034 B2
(45) Date of Patent: Apr. 9, 2024

(54) POWER COLUMN ACTUATOR MOUNTING DEVICE

(71) Applicant: STEERING SOLUTIONS IP HOLDING CORPORATION, Saginaw, MI (US)

(72) Inventors: Randy W. Jones, North Branch, MI (US); James E. Rouleau, Burt, MI (US); Todd M. King, Saginaw, MI (US); Robert D. Maida, Pinconning, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/075,143

(22) Filed: Dec. 5, 2022

(65) Prior Publication Data

US 2023/0174139 A1  Jun. 8, 2023

Related U.S. Application Data

(60) Provisional application No. 63/285,950, filed on Dec. 3, 2021.

(51) Int. Cl.
*B62D 1/181* (2006.01)
*B62D 1/185* (2006.01)

(52) U.S. Cl.
CPC ............ *B62D 1/181* (2013.01); *B62D 1/185* (2013.01)

(58) Field of Classification Search
CPC ................................ B62D 1/181; B62D 1/185
See application file for complete search history.

(56) References Cited

U.S. PATENT DOCUMENTS

| 2018/0134308 | A1* | 5/2018 | Derocher | F16H 25/2204 |
| 2021/0229733 | A1* | 7/2021 | Kurokawa | B62D 1/184 |
| 2022/0177022 | A1* | 6/2022 | Huber | B62D 1/181 |
| 2023/0182802 | A1* | 6/2023 | Bayer | B62D 1/185 280/775 |

FOREIGN PATENT DOCUMENTS

| CN | 107757700 A | * | 3/2018 | ............. B62D 1/181 |
| CN | 114524016 A | * | 5/2022 | ............. B62D 1/181 |
| CN | 115551764 A | * | 12/2022 | ............. B62D 1/181 |
| DE | 102017213807 A1 | * | 10/2017 | ............. B62D 1/16 |
| DE | 102018122767 A1 | * | 3/2020 | ............. B62D 1/181 |
| DE | 102019201544 A1 | * | 8/2020 | |
| DE | 102019207525 A1 | * | 11/2020 | ............. B62D 1/185 |
| DE | 102019215670 B3 | * | 11/2020 | |
| WO | WO-2019121330 A1 | * | 6/2019 | ............. B62D 1/181 |

* cited by examiner

*Primary Examiner* — Drew J Brown
(74) *Attorney, Agent, or Firm* — Dickinson Wright PLLC

(57) ABSTRACT

A power driven, telescoping steering column having a tubular outer jacket, a tubular inner jacket, and a tubular intermediate jacket arranged for coaxial telescopic movement relative with one another via actuation of an actuator assembly includes, a mounting device operably coupled against relative axial movement with the tubular outer jacket, with the actuator assembly being coupled to the mounting device without being fixedly connected or attached to the tubular outer jacket.

17 Claims, 9 Drawing Sheets

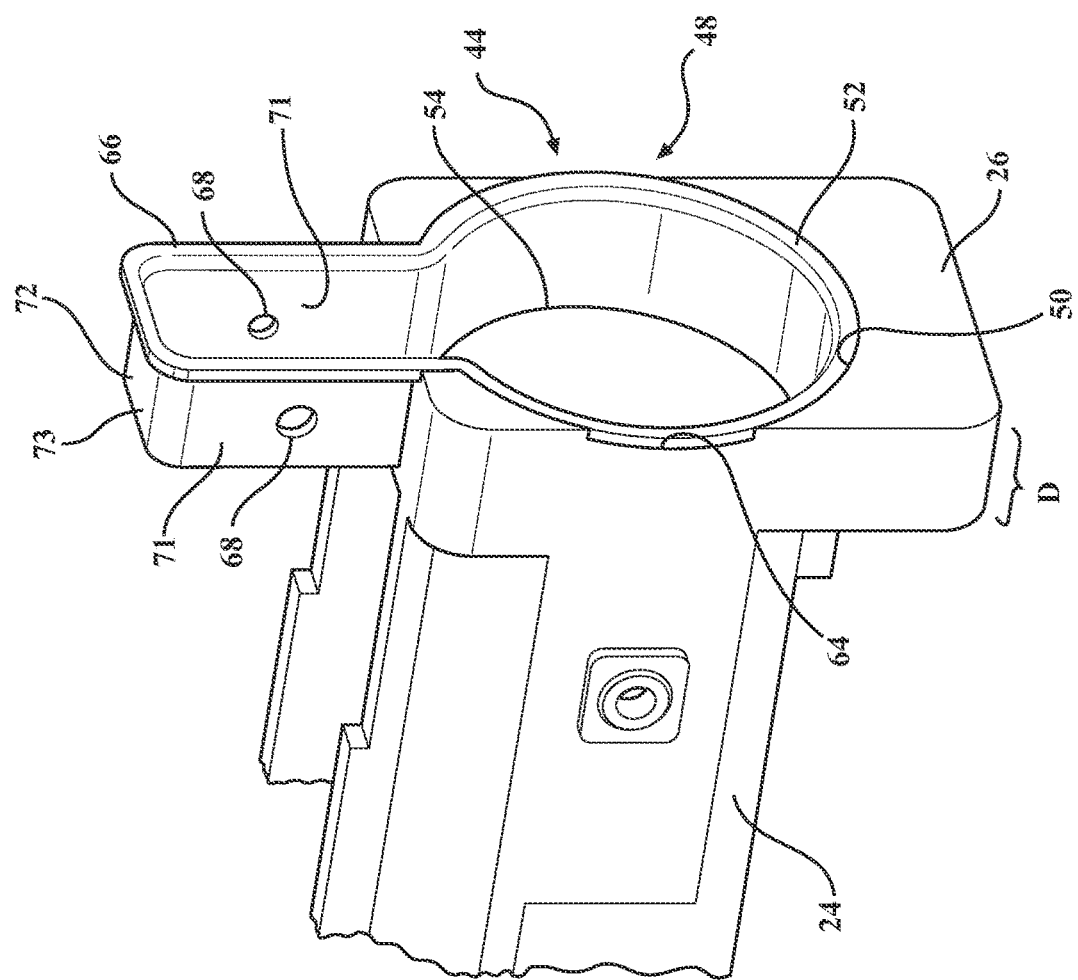
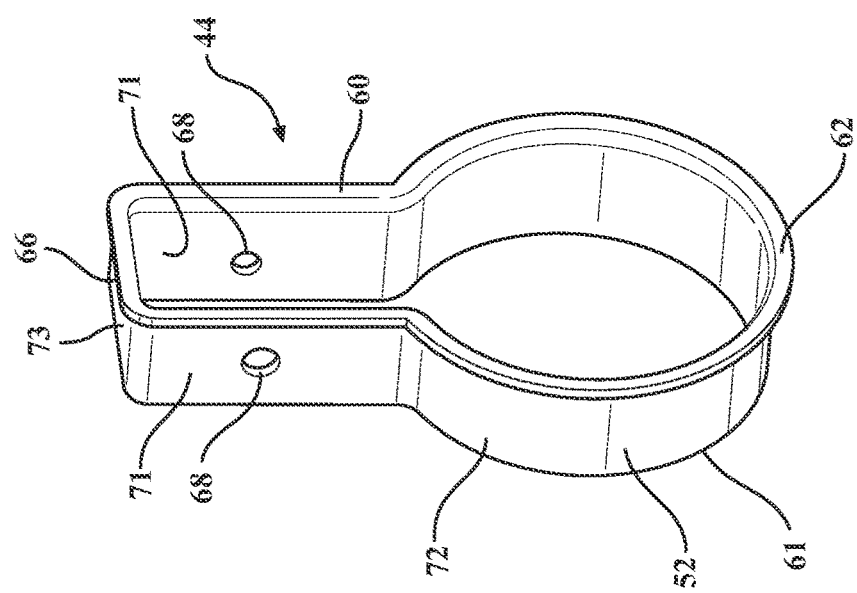
FIG. 6
FIG. 5

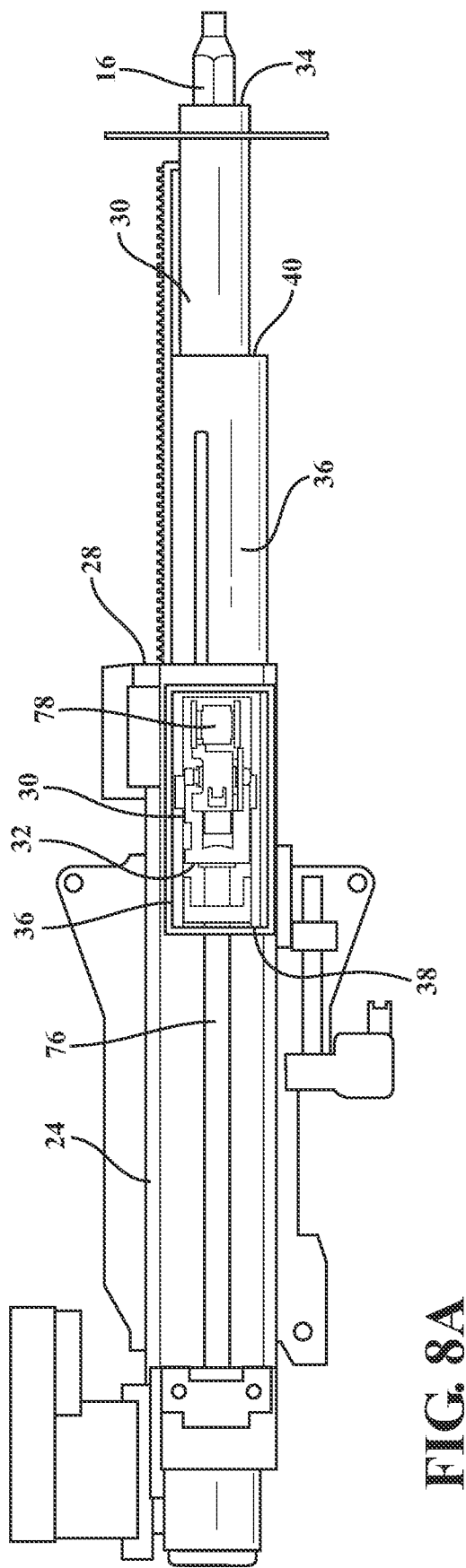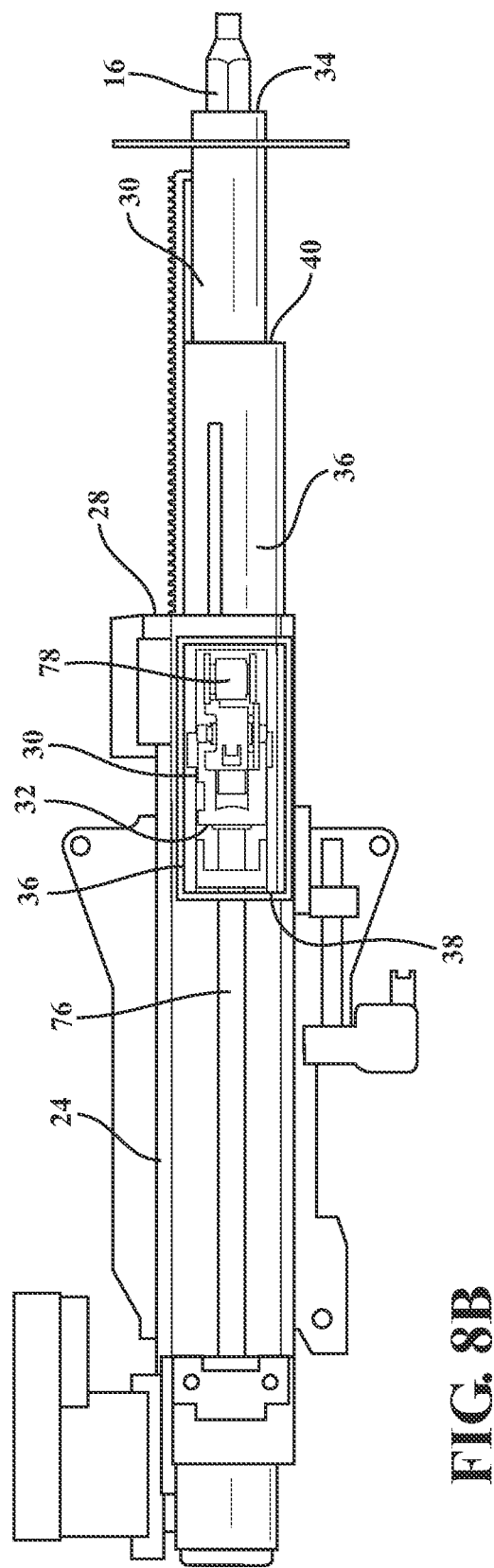
FIG. 8A
FIG. 8B

POWER COLUMN ACTUATOR MOUNTING DEVICE

CROSS-REFERENCE TO RELATED APPLICATION

This application claims the benefit of U.S. Provisional Application Ser. No. 63/285,950, filed Dec. 3, 2021, which is incorporated herein by reference in its entirety.

FIELD OF THE INVENTION

The following description relates to steering column assemblies and, more specifically, to a retractable steering column assembly and actuator mounting device therefor.

BACKGROUND OF THE INVENTION

Vehicles are increasingly being provided with power driven, telescoping steering columns. The power driven, telescoping steering columns have an actuator mounted to the steering column to effectuate power driven, telescoping movement of one or more coaxially aligned tubes of the steering column. To facilitate mounting the actuator to the steering column, typically an outer housing, sometimes referred to as outer casing, jacket or tube, is constructed having an integral actuator mount feature fixed in direct, attached relation thereto, wherein the mount feature is typically cast or machined as a monolithic piece of material with the outer casing. Although such mount features can provide an effective mechanism for attaching the actuator to the steering column, they come at a cost. For example, such mount arrangements are costly in manufacture by requiring intricate molds and/or machining processes, and further increase the outer envelop (size) of the outer casing, thereby making it more costly to store, transport/ship and assemble.

Accordingly, it is desired to provide a power actuator mounting device that enables the mounting of a power actuator to a power driven, telescoping steering column in a reliable and economical manner, while also reducing the cost associated with the manufacture, shipping, and stowage of components and assembly thereof.

SUMMARY OF THE INVENTION

According to one exemplary embodiment of the disclosure a power driven, telescoping steering column includes: a tubular outer jacket extending along a central axis between an outer jacket lower end and an outer jacket upper end; a tubular inner jacket extending along the central axis between an inner jacket lower end and an inner jacket upper end; a tubular intermediate jacket extending along the central axis between an intermediate jacket lower end and an intermediate jacket upper end, with the intermediate jacket lower end being configured for telescopic movement relative to the tubular outer jacket and the intermediate jacket upper end being configured for telescopic movement relative to the tubular inner jacket; an actuator assembly configured to power the relative telescoping movement between the intermediate jacket lower end and the tubular outer jacket and between the intermediate jacket upper end and the tubular inner jacket; and a mounting device operably coupled against relative movement with the tubular outer jacket, with the mounting device being coupled to the actuator assembly, such that upon selective actuation of the actuator assembly, the intermediate jacket lower end moves in telescoping relation with the tubular outer jacket and the intermediate jacket upper end moves in telescoping relation with the tubular inner jacket.

In another exemplary embodiment of the present invention, a method of constructing a power driven, telescoping steering column includes: providing a tubular outer jacket extending along a central axis between an outer jacket lower end and an outer jacket upper end; providing a tubular inner jacket extending along the central axis between an inner jacket lower end and an inner jacket upper end; providing a tubular intermediate jacket extending along the central axis between an intermediate jacket lower end and an intermediate jacket upper end; arranging the intermediate jacket lower end for telescopic movement relative to the tubular outer jacket; arranging the intermediate jacket upper end for telescopic movement relative to the tubular inner jacket; arranging an actuator assembly to power the relative telescoping movement between the intermediate jacket lower end and the tubular outer jacket and between the intermediate jacket upper end and the tubular inner jacket; and operably coupling a mounting device against relative axial movement with the tubular outer jacket, with the mounting device being coupled to the actuator assembly, such that upon selective actuation of the actuator assembly, the intermediate jacket lower end moves in telescoping relation with the tubular outer jacket and the intermediate jacket upper end moves in telescoping relation with the tubular inner jacket.

These and other advantages and features will become readily apparent to one possessing ordinary skill in the art in view of the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 5 is a perspective view of a mounting device of the steering column assembly of FIGS. 2A and 2B;

FIG. 6 is a perspective lower end view of a tubular outer jacket of the steering column assembly of FIGS. 2A and 2B illustrating the mounting device of FIG. 5 disposed in a pocket extending into an outer jacket lower end of the tubular outer jacket;

FIGS. 8A and 8B illustrate the steering column assembly of FIGS. 2A and 2B shown in respective extended and retracted positions with the tubular outer jacket removed for clarity purposes only.

DETAILED DESCRIPTION

Figure 1:
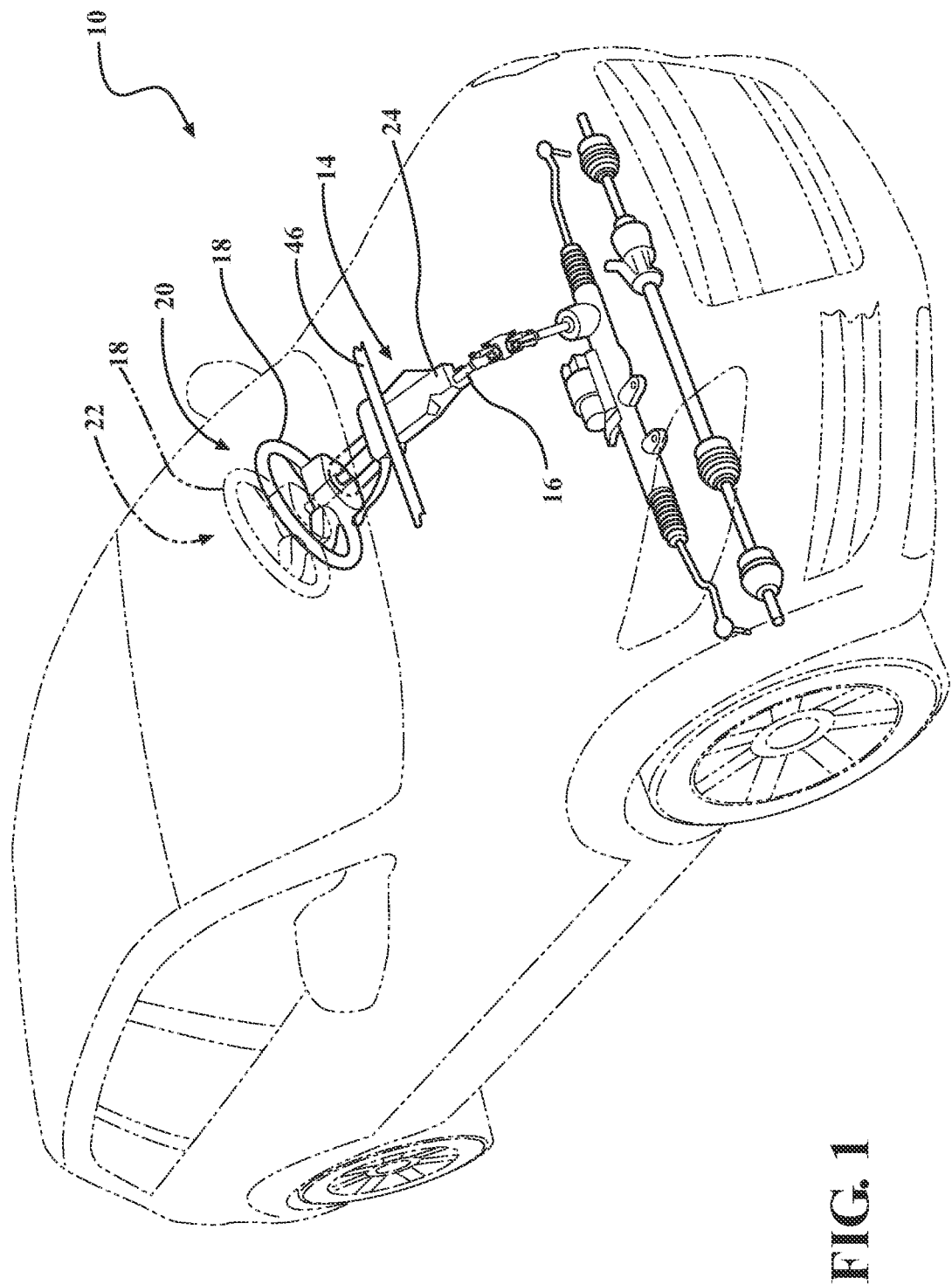
FIG. 1 is a schematic view of a vehicle and steering column assembly according to one embodiment of the disclosure.

Referring now to the Figures, where the invention will be described with reference to specific embodiments, without limiting same, FIG. 1 illustrates an exemplary vehicle 10, such as an autonomous driving assisted steering ("ADAS") equipped vehicle, having a power driven, telescoping steering column assembly 14. The steering column assembly 14, among other things, includes a steering column shaft 16 and a steering input device, such as steering wheel 18, coupled thereto.

In the illustrated embodiment, steering column assembly 14 is movable between a retracted position 20, and an extended, also referred to as deployed or driving position 22. In the retracted position 20, portions of steering column assembly 14 14, such as steering wheel 18, are disposed away from the driver, which provides increased space for the driver. The displacement of the steering column shaft 16 and wheel 18 in retracted position 20 creates additional cabin space for the driver's comfort and convenience to perform non-driving activities including, but not limited to, reading, working, entertaining, eating, etc. In the driving position 22, steering wheel 18 may be used by a driver to steer the vehicle. In certain embodiments, the position of the steering column shaft 16 and the steering wheel 18 can be adjusted in the driving position 22 to provide a desired position for the driver. The adjustable driving position may be stored or otherwise recorded when returning from a retracted position 20 to a driving position 22.

In certain embodiments, the steering wheel 18 can be automatically retracted in a retracted position 20 in response to the initiation of an autonomous driving event. Similarly, the steering wheel 18 can be extended to the driving position 22 to provide control to the driver at the termination of an autonomous driving event, or when an autonomous driving system requires the input of the driver. Accordingly, it may be desired to extend the steering wheel 22 to the driving position 22 rapidly to provide control to the driver as required.

Steering column assembly 14 includes a tubular outer jacket 24 extending along a central axis A between an outer jacket lower end 26 and an outer jacket upper end 28. A tubular inner jacket 30 extends along the central axis A between an inner jacket lower end 32 and an inner jacket upper end 34. A tubular intermediate jacket 36 extends along the central axis A between an intermediate jacket lower end 38 and an intermediate jacket upper end 40. The intermediate jacket lower end 38 is configured for telescopic movement relative to the tubular outer jacket 24 and the intermediate jacket upper end 40 is configured for telescopic movement relative to the tubular inner jacket 30. An actuator assembly 42 is configured to power the relative telescoping movement between the intermediate jacket lower end 38 and the tubular outer jacket 24 and between the intermediate jacket upper end 34 and the tubular inner jacket 30. A power column actuator mounting device, referred to hereafter as mounting device 44, is operably coupled against relative axial movement with the tubular outer jacket 23. The mounting device 44 is operably coupled to the actuator assembly 42, such that upon selective actuation of the actuator assembly 42, the intermediate jacket lower end 38 moves in telescoping relation with the tubular outer jacket 24 and the intermediate jacket upper end 40 moves in telescoping relation with the tubular inner jacket 30.

In the non-limiting embodiment illustrated, the intermediate jacket lower end 38 is disposed in the outer jacket upper end 28 for low friction sliding translation within the tubular outer jacket 24 along the central axis A, and the inner jacket lower end 32 is disposed in the intermediate jacket upper end 40 for low friction sliding translation within the intermediate jacket 36 along the central axis A. Accordingly, the outer jacket 24, intermediate jacket 30, and the inner jacket 30 are oriented in coaxial relation with one another for straight, linear translation relative to one another.

The tubular outer jacket 24 is configured to be attached to a vehicle body frame member 46 against relative movement therewith.

Figure 7:
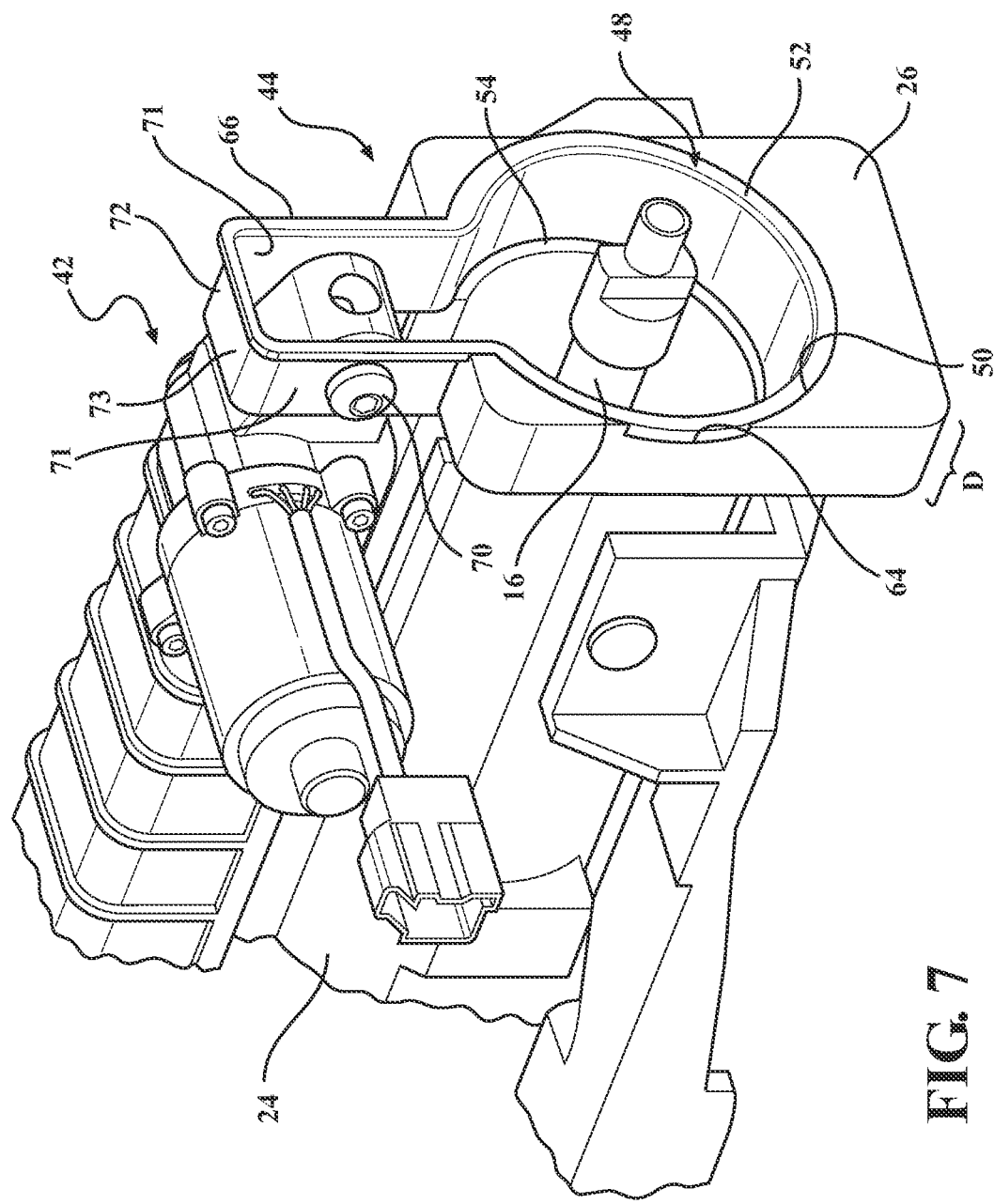
FIG. 7 is a view similar to FIG. 6 illustrating an actuator assembly assembled to the tubular outer jacket in coupled relation with the mounting device.
Figure 8C:
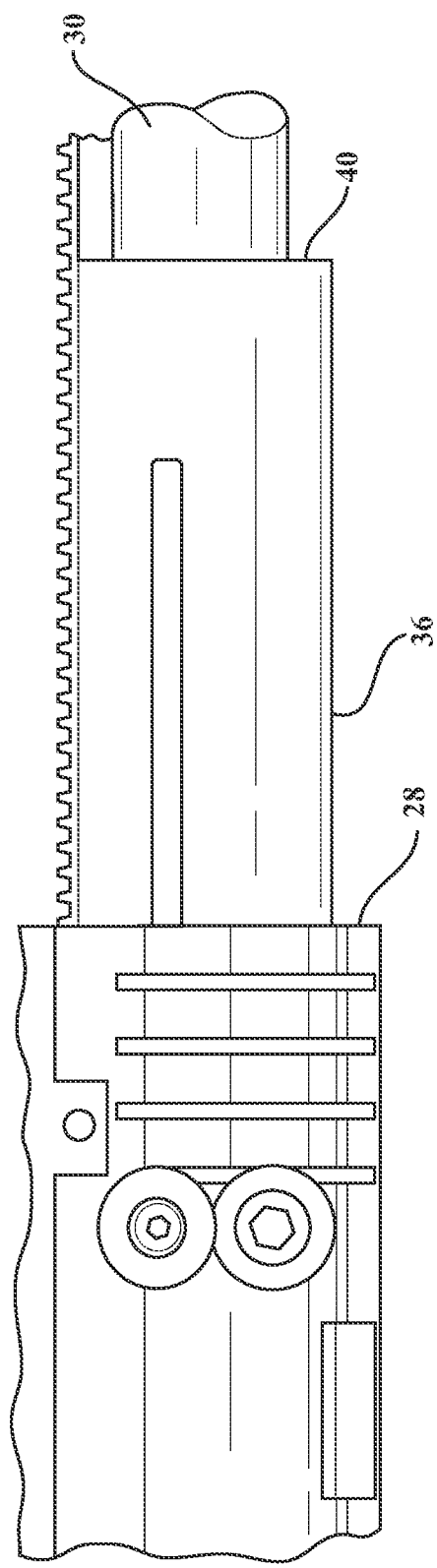
FIG. 8C is a view similar to FIGS. 8A and 8B illustrating the tubular outer jacket assembled to the steering column assembly.

As best shown in FIGS. 6 and 7, the mounting device 44 is illustrated as being disposed in a pocket 48 extending into the outer jacket lower end 26. The pocket 48 is bounded by a purely cylindrical or generally cylindrical inner surface 50 of the outer jacket 24 (meaning the inner surface may be slightly less than a true cylindrical shape, but closely approximating a cylindrical shape). The mounting device 44 can be formed having a correspondingly shaped cylindrical or generally cylindrical outer surface 52 configured for one of an interference press fit, line-to-line press fit, and a loose floating fit, also referred to as clearance fit or slip fit, with the cylindrical inner surface 50. To facilitate ease of locating the mounting device 44 in the desired axial location within the pocket 48, the pocket 48 can extend to a counterbore shoulder 54 formed to a predetermined depth (D) into the outer jacket lower end 26. Upon inserting and locating the mounting device 44 in the pocket 48, whether in a press fit, line-to-line fit or floating fit, and an end cover 56 can be fixed to the outer jacket lower end 26 to close off the pocket 48 and constrain the mounting device 44 to prevent axial movement of the mounting device 44 in the pocket 48 between the end cover 56 and the counterbore shoulder 54. The end cover 56 can be provided integrally with a handwheel actuator 58, by way of example and without limitation, or a bearing retainer, electric power steering unit, or otherwise. To further or alternatively facilitate locating the mounting device 44 against axial movement within the pocket 48, in addition to the counterbore shoulder 54, or in lieu thereof, the outer surface 52 extending between opposite ends 60, 61 of the mounting device 44, (FIG. 5), can be provided having a seating flange 62 extending radially outwardly therefrom at one of the opposite ends 60, 61, with the seating flange 62 being configured to be captured in sandwiched relation between the outer jacket lower end 26 and the end cover 56. The seating flange 62 can extend about the entire circumferential periphery of the respective opposite end 60, 61, or partially, as desired. The outer jacket lower end 26 can be provided having a recessed annular surface, also referred to as counterbore 64, configured (sized and shaped) for receipt of the seating flange 62 thereagainst such that seating flange 62 prevents further insertion of the mounting device 44 into the pocket 48, whereat the seating flange 62 is flush or generally flush with the outer jacket lower end 26 upon inserting the mounting device 44 in the pocket 48, thereby providing for a flush, smooth engagement between the outer jacket lower end 26 and a seal face 65 of the end cover 56. As such, the depth D of pocket 48 can be greater than a width of mounting device 44 extending between the opposite ends 60, 61, thereby simplifying manufacture of the outer jacket 24, while at the same time ensuring mounting device 44 is constrained against relative axial movement with outer jacket 24 via capture of the seating flange 62 between the counterbore 64 and the seal face 65 upon fixing the end cover 56 to the outer jacket 24.

Mounting device 44 is shown having a mount flange 66 extending radially outwardly from the cylindrical outer surface 52. The mount flange 66 is configured and shown to be joined (operably coupled) to the actuator assembly 42. To facilitate joining the actuator assembly 42 to mount flange 66, fastener opening(s) 68 can be provided in mount flange 66, with a pair of fastener openings 68 shown in opposite, aligned facing relation with one another, by way of example and without limitation, with fastener openings 68 be arranged for receipt of a suitable fastener 70 therein. Mount flange 66 is shown, by way of example and without limitation, as having a pair of legs 71 extending radially outwardly from the cylindrical outer surface 52 in laterally spaced relation from one another, with a motor 74 of the actuator assembly 42 extending between the legs 71. The legs 71 are shown being joined to one another via a cross-leg, also referred to as bridge 73, thereby strengthening the structure of the mount flange 66, wherein the mount flange 66 is shown as being generally U-shaped as viewed looking along the central axis A, by way of example and without limitation. Mounting device 44 is further shown having a continuous outer periphery 72 extending about the cylindrical outer surface 52 and the mount flange 66. Accordingly, the actuator assembly 42 is coupled to the mounting device 44 to effect axial movement of the inner jacket 30 in response to selective actuation of actuator assembly 42, as discussed further below.

Mounting device 44 can be constructed from any suitable material, including sufficiently rigid plastic material, such as can be fabricated via a molding process, or a metal material, such as from a strip of metal that is formed via any desired forming process, such as stamping, by way of example and without limitation. The metal material can be formed and subsequently bonded, such as via an adhesive and/or welding process, thereby rendering the mounting device 44 having a circumferentially continuous body, by way of example and without limitation. It is to be understood that mount flange 66 can be formed as a single radially outwardly extending piece of material, if desired. With mounting device 44 being a separate piece of material from the outer jacket 24, manufacture of the outer jacket 24 is simplified, as is the shipping and storage thereof. Further yet, with the mounting device 44 not being directly connected or attached to the outer jacket 24, the weight of the outer jacket 24 can be significantly reduced by not having the mounting device cast or otherwise formed as a monolithic piece of material therewith, wherein the mounting device 44 can be formed of a relatively lightweight piece of metal or plastic, as discussed above.

Figure 2A:
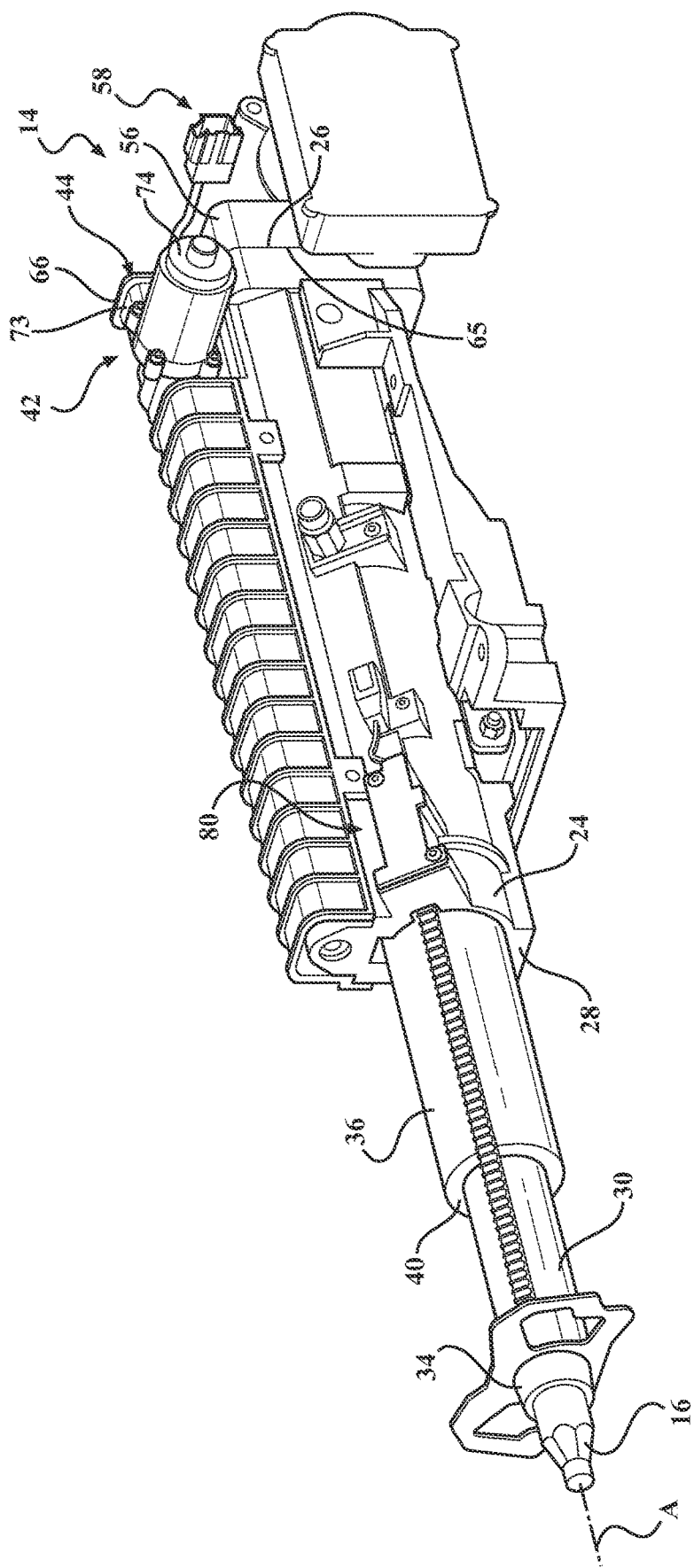
FIG. 2A is a perspective upper end view of a steering column assembly according to one embodiment of the disclosure.
Figure 2B:
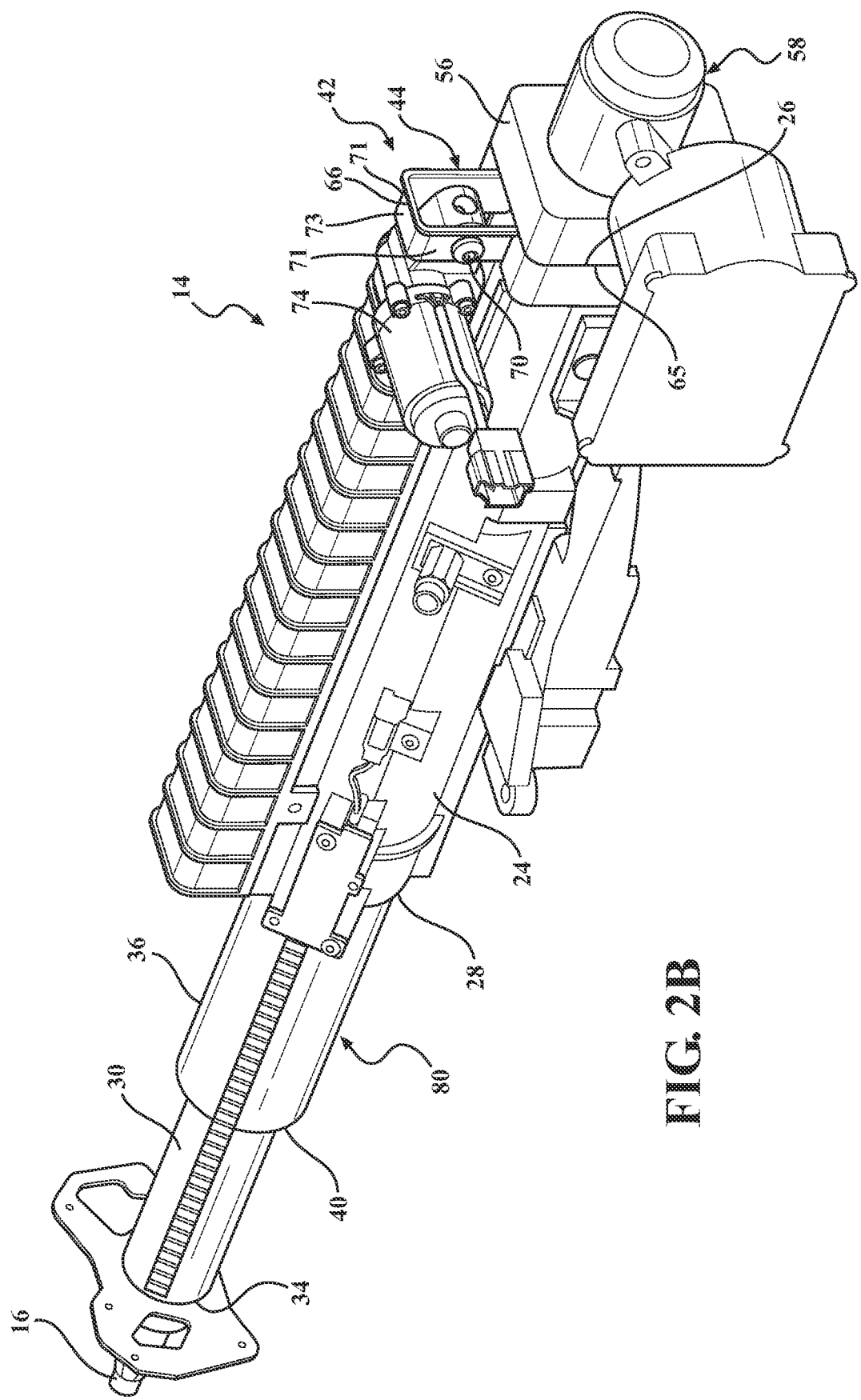
FIG. 2B is a perspective lower end view of the steering column assembly of FIG. 2A.
Figure 3:
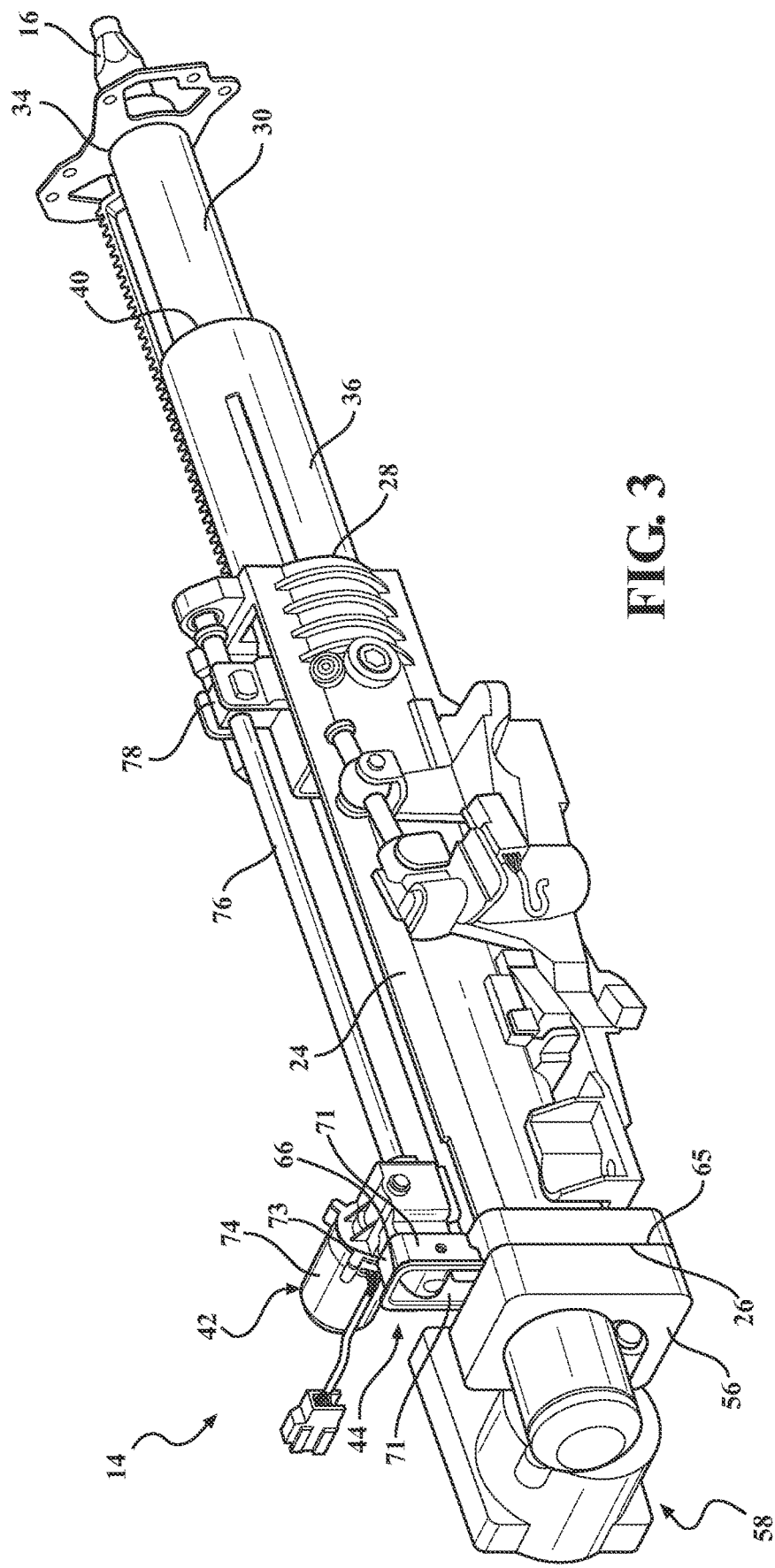
FIG. 3 is a view similar to FIG. 2A with a cover removed from a portion of an actuator assembly of the steering column assembly of FIGS. 2A and 2B for clarity purposes only.
Figure 4:
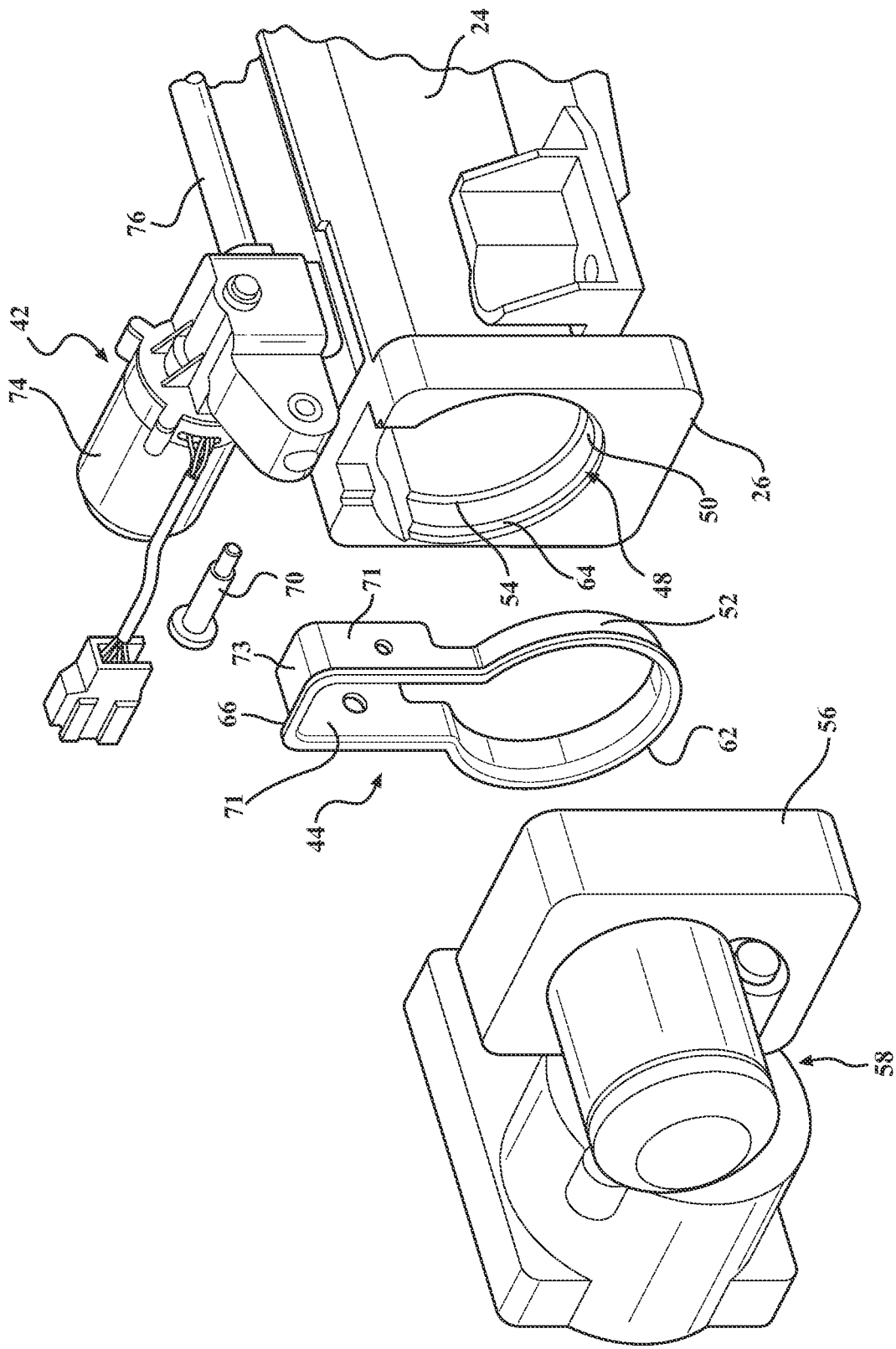
FIG. 4 is a fragmentary exploded view of a lower end of the steering column assembly as shown in FIG. 3.

Actuator assembly 42 can be provided having a motor 74 configured to rotatably drive a screw 76 (best shown in FIG. 3), with screw 76 being arranging to drive a nut 78 for axial translation along the screw 76, with the nut 78 being operably coupled to inner jacket 30, thereby causing conjoint axial translation of the inner jacket 30 with the nut 78. A person possessing ordinary skill in the art (POSA) of leadscrew and ballscrew assemblies, as generally described, will readily appreciate and understand the disclosure herein. Further actuator mechanisms can be provided to provide comfort range adjustments, such as shown, by way of example and without limitation, via actuator assembly operably coupling outer jacket 24 to inner jacket 30, as generally shown at 80 in FIGS. 2A and 2B.

In accordance with another aspect of the disclosure, a method of constructing a power driven, telescoping steering column assembly 14 is provided. The method includes: providing a tubular outer jacket 24 tending along a central axis A between an outer jacket lower end 26 and an outer jacket upper end 28; providing a tubular inner jacket 30 extending along the central axis A between an inner jacket lower end 32 and an inner jacket upper end 34; providing a tubular intermediate jacket 36 extending along the central axis A between an intermediate jacket lower end 38 and an intermediate jacket upper end 40; arranging the intermediate jacket lower end 38 for telescopic movement relative to the outer jacket 24; arranging the intermediate jacket upper end 34 for telescopic movement relative to the tubular inner jacket 30; arranging an actuator assembly 42 to power the relative telescoping movement between the intermediate jacket lower end 38 and the outer jacket 24 and between the intermediate jacket upper end 40 and the inner jacket 30; and operably coupling a mounting device 44 against relative axial movement with the outer jacket 24, with the mounting device 44 being coupled to the actuator assembly 42, such that upon selective actuation of the actuator assembly 42, the intermediate jacket lower end 38 moves in telescoping relation with the outer jacket 24 and the intermediate jacket upper end 40 moves in telescoping relation with the tubular inner jacket 30.

The method can further include operably coupling the actuator assembly 42 against relative axial movement with the outer jacket 24 without fixedly connecting or attaching the actuator assembly 42 to structure of the outer jacket 24. As such, construction of the outer jacket 24 can be simplified, and weight of the outer jacket 24 can be reduced, and storage and shipping of the outer jacket 24 can be simplified, by not having to include an attachment structure formed on and extending from the outer jacket 24 for attachment to the actuator assembly 42.

The method can further include coupling the mounting device 44 against relative axial movement with the tubular outer jacket 24 by bringing a cylindrical outer surface 52 of the mounting device 44 into a clearance fit with a cylindrical inner surface 50 of the tubular outer jacket 24.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments, wherein the steering column could include only the inner and outer tubular jackets. Individual elements or features of a particular embodiment are generally not limited to that particular embodiment, but, where applicable, are interchangeable and can be used in a selected embodiment, even if not specifically shown or described. Accordingly, the invention is not to be seen as limited by the foregoing description.

Having thus described the invention, it is claimed:

1. A power driven, telescoping steering column, comprising:
   a tubular outer jacket extending along a central axis between an outer jacket lower end and an outer jacket upper end;

a tubular inner jacket extending along said central axis between an inner jacket lower end and an inner jacket upper end;

a tubular intermediate jacket extending along said central axis between an intermediate jacket lower end and an intermediate jacket upper end, said intermediate jacket lower end being configured for telescopic movement relative to said tubular outer jacket and said intermediate jacket upper end being configured for telescopic movement relative to said tubular inner jacket;

an actuator assembly configured to power the relative telescoping movement between said intermediate jacket lower end and said tubular outer jacket and between said intermediate jacket upper end and said tubular inner jacket; and a mounting device formed of a separate piece of material from said tubular outer jacket and being operably coupled against relative axial movement with said tubular outer jacket, said mounting device being coupled to said actuator assembly, such that upon selective actuation of said actuator assembly, said intermediate jacket lower end moves in telescoping relation with said tubular outer jacket and said intermediate jacket upper end moves in telescoping relation with said tubular inner jacket, wherein said mounting device is disposed in a pocket extending into said outer jacket lower end, and further including an end cover closing off said pocket and constraining said mounting device against axial movement in said pocket.

2. The power driven, telescoping steering column of claim 1, wherein said outer jacket has a cylindrical inner surface bounding said pocket and said mounting device has a cylindrical outer surface configured for one of an interference press fit, line-to-line fit, and a clearance fit with said cylindrical inner surface.

3. The power driven, telescoping steering column of claim 2, wherein said cylindrical outer surface has an interference press fit with said cylindrical inner surface.

4. The power driven, telescoping steering column of claim 2, wherein said cylindrical outer surface has a line-to-line fit with said cylindrical inner surface.

5. The power driven, telescoping steering column of claim 2, wherein said cylindrical outer surface has a clearance fit with said cylindrical inner surface.

6. The power driven, telescoping steering column of claim 2, wherein said cylindrical outer surface of said mounting device extends between opposite ends, one of said opposite ends having seating flange extending radially outwardly from said cylindrical outer surface, said seating flanged being configured in sandwiched relation between said outer jacket lower end and said end cover.

7. The power driven, telescoping steering column of claim 6, wherein said cylindrical inner surface has a counterbore extending axially from said outer jacket lower end, said seating flange being received in said counterbore such that said seating flange is flush with said outer jacket lower end.

8. The power driven, telescoping steering column of claim 2, wherein said mounting device has a mount flange extending radially outwardly from said cylindrical outer surface, said mount flange being operably coupled to said actuator assembly.

9. The power driven, telescoping steering column of claim 8, wherein said mount flange has a pair of legs extending radially outwardly from said cylindrical outer surface in spaced relation from one another, said actuator assembly extending between said legs.

10. The power driven, telescoping steering column of claim 9, wherein said mount flange is generally U-shaped as viewed looking along said central axis.

11. The power driven, telescoping steering column of claim 10, wherein said mounting device has a continuous outer periphery extending about said cylindrical outer surface and said mount flange.

12. The power driven, telescoping steering column of claim 1, wherein said actuator assembly is operably coupled to said tubular outer jacket.

13. The power driven, telescoping steering column of claim 12, wherein said actuator assembly is operably coupled to said tubular inner jacket.

14. A power driven, telescoping steering column, comprising:
a tubular outer jacket extending along a central axis between an outer jacket lower end and an outer jacket upper end;

a tubular inner jacket extending along said central axis between an inner jacket lower end and an inner jacket upper end;

a tubular intermediate jacket extending along said central axis between an intermediate jacket lower end and an intermediate jacket upper end, said intermediate jacket lower end being configured for telescopic movement relative to said tubular outer jacket and said intermediate jacket upper end being configured for telescopic movement relative to said tubular inner jacket;

an actuator assembly configured to power the relative telescoping movement between said intermediate jacket lower end and said tubular outer jacket and between said intermediate jacket upper end and said tubular inner jacket;

a mounting device disposed in one of an interference press fit, a line-to-line fit, and a clearance fit with said tubular outer jacket, said mounting device being coupled to said actuator assembly, such that upon selective actuation of said actuator assembly, said intermediate jacket lower end moves in telescoping relation with said tubular outer jacket and said intermediate jacket upper end moves in telescoping relation with said tubular inner jacket; and an end cover fixed to said outer jacket lower end, said end cover preventing relative axial movement between said mounting device and said tubular outer jacket.

15. The power driven, telescoping steering column of claim 14, wherein said tubular outer jacket has a cylindrical inner surface bounding a pocket, said mounting device being disposed in said pocket in a clearance fit relative to said cylindrical inner surface.

16. A method of constructing a power driven, telescoping steering column, comprising:
providing a tubular outer jacket extending along a central axis between an outer jacket lower end and an outer jacket upper end;

providing a tubular inner jacket extending along said central axis between an inner jacket lower end and an inner jacket upper end;

providing a tubular intermediate jacket extending along said central axis between an intermediate jacket lower end and an intermediate jacket upper end;

arranging said intermediate jacket lower end for telescopic movement relative to said tubular outer jacket;

arranging said intermediate jacket upper end for telescopic movement relative to said tubular inner jacket;

coupling a mounting device against relative axial movement with said tubular outer jacket in one of an interference press fit, a line-to-line fit, and a clearance fit with said tubular outer jacket;

coupling an actuator assembly to said mounting device such that upon selective actuation of said actuator assembly, said intermediate jacket lower end moves in telescoping relation with said tubular outer jacket and said intermediate jacket upper end moves in telescoping relation with said tubular inner jacket; and operably coupling said actuator assembly against relative axial movement to said tubular outer jacket without fixedly connecting or attaching the actuator assembly directly to the tubular outer jacket.

17. A method of constructing a power driven, telescoping steering column, comprising:

providing a tubular outer jacket extending along a central axis between an outer jacket lower end and an outer jacket upper end;

providing a tubular inner jacket extending along said central axis between an inner jacket lower end and an inner jacket upper end;

providing a tubular intermediate jacket extending along said central axis between an intermediate jacket lower end and an intermediate jacket upper end;

arranging said intermediate jacket lower end for telescopic movement relative to said tubular outer jacket;

arranging said intermediate jacket upper end for telescopic movement relative to said tubular inner jacket;

coupling a mounting device against relative axial movement with said tubular outer jacket in one of an interference press fit, a line-to-line fit, and a clearance fit with said tubular outer jacket;

coupling an actuator assembly to said mounting device such that upon selective actuation of said actuator assembly, said intermediate jacket lower end moves in telescoping relation with said tubular outer jacket and said intermediate jacket upper end moves in telescoping relation with said tubular inner jacket; and coupling said mounting device against relative axial movement with said tubular outer jacket by bringing a cylindrical outer surface of said mounting device into a clearance fit with a cylindrical inner surface of said tubular outer jacket.

\* \* \* \* \*